Figure 1:
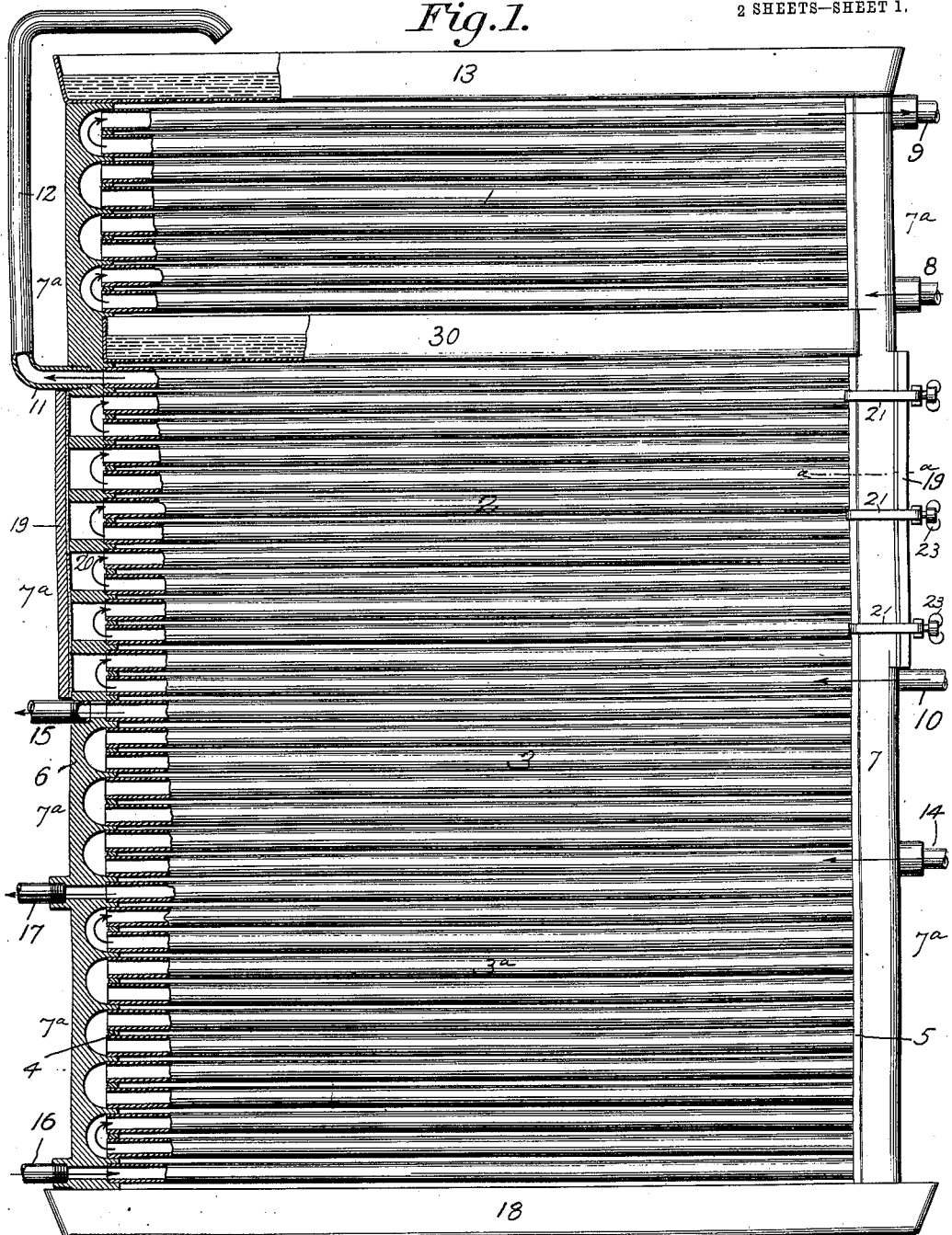

No. 840,961. PATENTED JAN. 8, 1907.
C. W. REID.
REGENERATIVE PASTEURIZING SYSTEM.
APPLICATION FILED SEPT. 27, 1906.

2 SHEETS—SHEET 1.

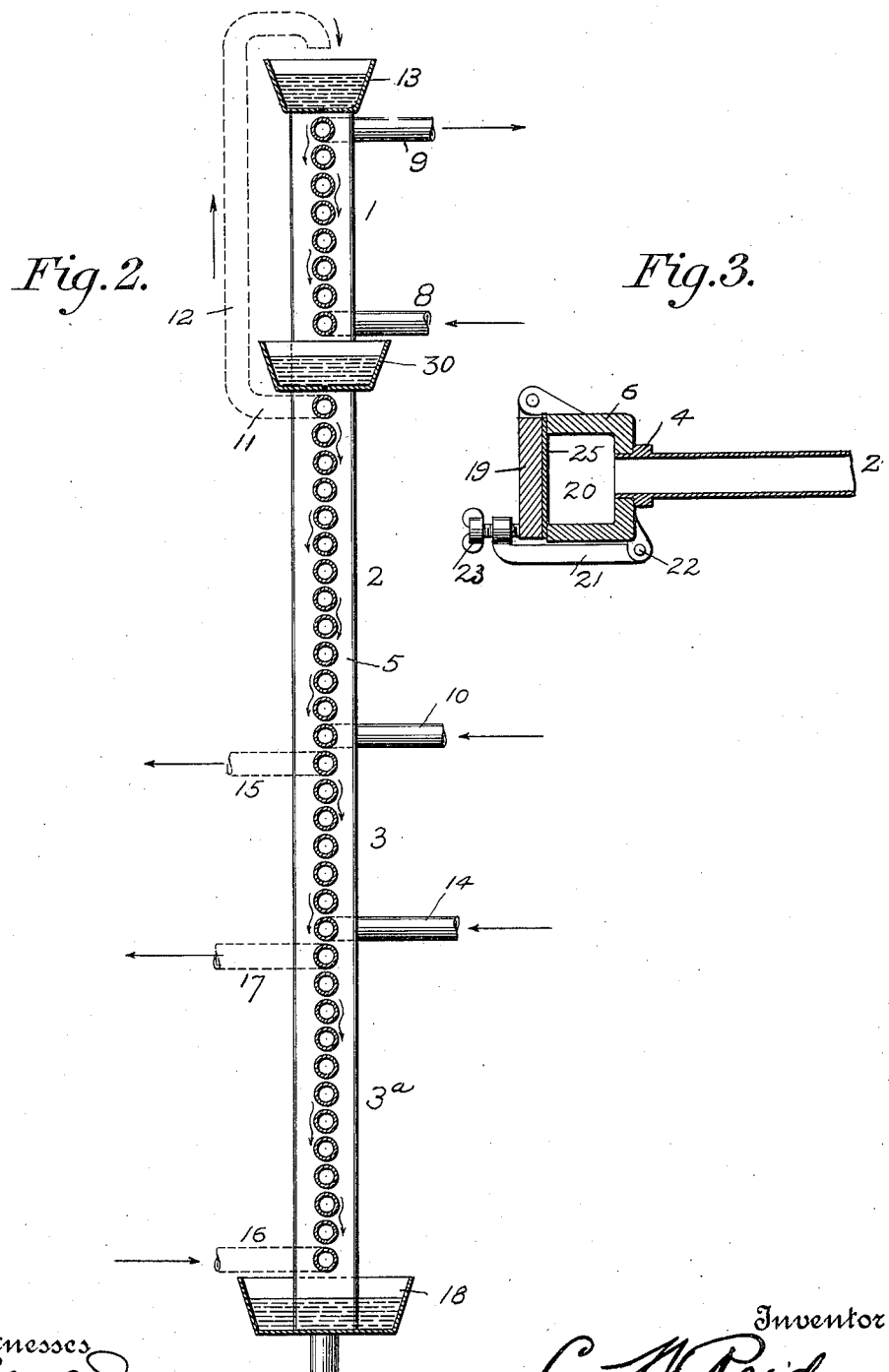

UNITED STATES PATENT OFFICE.

CHARLES W. REID, OF MILFORD, DELAWARE.

REGENERATIVE PASTEURIZING SYSTEM.

No. 840,961.　　　　Specification of Letters Patent.　　　　Patented Jan. 8, 1907.

Application filed September 27, 1906. Serial No. 336,405.

*To all whom it may concern:*

Be it known that I, CHARLES W. REID, of Milford, county of Kent, and State of Delaware, have invented a new and useful Improvement in Regenerative Pasteurizing Systems, of which the following is a specification.

This invention relates to the pasteurization of milk on the regenerative system, in which the incoming cold or raw milk is circulated in proximity to the outgoing hot or pasteurized milk, with the result that the temperatures of the two currents tend by their reciprocal action to equalize, the cold milk being raised in temperature and the hot milk reduced in temperature.

The invention consists in an improved apparatus of simple construction for effecting the pasteurization and cooling of the pasteurized milk in an economical and expeditious manner.

In its general features the apparatus comprises three series or coils of superposed horizontally-arranged tubes, the tubes of each coil communicating with each other alternately at opposite ends and the several coils being non-communicating and arranged in a vertical plane one above the other, so as to form a continuous surface over which the milk flowing in a stream is first subjected to a pasteurizing action and then to a cooling action. The upper coils, through which the heating medium is circulated, constitutes the pasteurizer and effect the pasteurization of the milk flowing downward over its external surface. The intermediate coil, through which the incoming cold or raw milk is circulated and over which the pasteurized milk flows from the upper coil, serves as a means of equalizing the temperatures of the two streams, reducing that of the downflowing stream and raising that of the inner upflowing stream. The lower coil, through which the cooling medium is circulated and over which the milk from the exterior of the intermediate coil flows, constitutes a cooler to further reduce the temperature of the downflowing pasteurized milk.

The invention consists also in interposing between the lower end of the pasteurizing-coil and the upper end of the intermediate coil a collecting trough or basin, in which the pasteurized milk is received and by which it is discharged directly onto the intermediate coil, so that any variation in the temperature of the milk as it leaves the pasteurizing-coil will be equalized and it will flow onto the intermediate coil at a uniform temperature.

The invention consists also in combining with the lower cooling-coil an additional cooling-coil, with the result that the cooling of the pasteurized milk will be gradual and not too sudden.

The invention consists also in the details of construction and combination of parts hereinafter described and claimed.

In the accompanying drawings, Figure 1 is a side elevation of my improved apparatus, partly in section. Fig. 2 is an end elevation of the same, partly in section. Fig. 3 is a horizontal cross-section on the line *a a* of Fig. 1.

Referring to the drawings, 1 represents an upper coil or group of horizontally-arranged superposed tubes. 2 represents an intermediate coil of similarly-arranged tubes.

3 represents a lower coil.

The several coils are sustained one above the other at their ends by vertical end plates or columns 4 and 5. The tubes of each coil communicate with each other alternately at opposite ends by means of manifolds 6 and 7, closed by cap-plates $7^a$, so that a continuous course or channel is formed back and forth from one end of the coil to the other. The several coils are, however, non-communicating as far as any internal connection is concerned. They are arranged one above the other in a vertical plane, the upper end of each coil forming a continuation of the lower end of that next above, so that the several coils present an upright continuous flat body made up of the horizontally-arranged tubes.

The upper coil, which I designate the "pasteurizing-coil," has its lowermost tube extended to the outside, as at 8, at which point a heating medium is introduced into the coil from any suitable source and circulating therethrough it leaves the same through the upper tube, which is similarly extended to the outside, as at 9. The heating medium may be hot water, and it may be caused to circulate through the coil by gravity or pressure, its function being to so heat the coil that as the milk flows thereover, as will be presently described, it will be raised in temperature to the pasteurizing-point.

The intermediate coil 2, which I designate the "regenerative" coil, has its lowermost tube extended to the outside, as at 10, into which the cold raw milk is introduced from any suitable source either by gravity or by means of a pump. (Not shown.) Circulating through the tubes of this coil, the milk leaves the same by the upper tube, which is extended to the outside, as at 11, and connects with a vertical pipe 12, which directs the milk upward and discharges the same into a horizontal trough 13, arranged over the pasteurizing-coil. The bottom of this trough is perforated, and the milk escaping therefrom flows downward by gravity over the external surface of the pasteurizing-coil and by it is raised in temperature from about 140° Fahrenheit, its temperature in the trough, to about 160° Fahrenheit.

The raw milk enters the regenerative coil at tube 10 at about 60° Fahrenheit, and in its passage through this coil it is raised to about 140° Fahrenheit by the hot stream of pasteurized milk which flows over the external surface of the regenerative coil after it leaves the external surface of the pasteurizing-coil, so that by a reciprocal action of the two streams of milk, the one flowing cold through the coil and the other flowing hot on the external surface of the coil, the temperature of the internal stream is raised and that of the external stream is reduced, the latter being reduced from about 160° Fahrenheit to about 80° Fahrenheit by the time it reaches the lower end of the regenerative coil.

The lower coil 3, which I designate the "cooling-coil," has its lower tube extended to the outside, as at 14, into which the cooling medium is introduced and circulating through the coil leaves the same by the upper tube extended outward, as at 15. The cooling medium circulated through this coil may be of such temperature and the number of tubes in the coil may be such that the downflowing external stream of milk will be reduced from about 80° Fahrenheit, its temperature at the point where it flows onto the coil, to about 45° Fahrenheit, the final temperature desired. In order, however, that the reduction in temperature may not be too sudden, I propose to circulate through coil 3 water at a moderate temperature, such as spring-water, so as to bring the temperature of the milk down to about 70° Fahrenheit, and I provide for the purpose of further and finally reducing the temperature an additional cooling-coil 3ª, arranged vertically below the first one. I circulate therethrough ice water or brine from any suitable source, introducing the same by the lower tube 16 and carrying it off by the upper tube 17, both of which tubes are extended outward for the proper connections to be made. The downwardly-flowing milk passing onto this final coil at about 70° Fahrenheit leaves the same at about 45° Fahrenheit and is collected in a trough 18, from which it is discharged into a receiver 19.

It will be observed from the construction described that the raw cold milk after being raised by the regenerative action of the intermediate coil to about 140° Fahrenheit pursues a downward continuous course over the external surface of the several coils, being in its passage first effectually pasteurized and then gradually cooled to the proper degree for use.

In order that the milk flowing from the pasteurizing-coil may pass onto the regenerative coil at a uniform temperature throughout and not be of different temperatures at different points, which might result from an uneven flow of the milk over the coil, I interpose between the pasteurizing-coil and the regenerative coil an equalizing trough or basin 30, sustained between the columns 4 and 5 in position to receive the pasteurized milk from the upper coil and provided with openings in its bottom, through which the milk is discharged onto the lower coil. The pasteurized milk collecting in this trough and mingling causes any variation in temperature to be equalized. I do not deem this equalizing-trough essential to the operation of the apparatus, although it is preferable to employ it. Satisfactory results could be secured by dispensing with it and arranging the lower end of the pasteurizing-coil and the upper end of the regenerative coil in proximity.

In order that access may be had to the interior of the tubes of the regenerative coil for cleansing purposes, this being very desirable by reason of the fact that the milk is circulated through this coil, I propose to provide for removing at will the portions of the end cap-plates which cover the manifolds at this point. This construction is illustrated in Figs. 1 and 3, where it will be seen that the cap-plates at each end of the apparatus are provided each with a removable section 19, fitting tightly against the outer ends of the manifold-partitions 20 between the tubes, and are held in place by clamping-arms 21, pivoted, as at 22, to the side of the vertical columns 4 and 5 to swing outward, and provided with a clamping-screw 23, adapted to bear against the outer side of the movable section and hold the same firmly in place, thereby forming a continuation of the remaining fixed portions of the cap-plates.

A packing 25, of rubber, is introduced between the movable sections and the ends of the manifold-partitions to form a tight joint. To remove the sections, the clamping-screws are loosened and the clamping-arms thrown outward. The sections being now lifted off, the open ends of the tubes are fully exposed, so that a swab or other cleansing instrument may be freely introduced or other means may be employed to effectually cleanse the interior of the tubes.

I do not claim herein the combination with a series of horizontal superposed tubes of means for circulating raw milk through the tubes, means for pasteurizing the raw milk, and means for discharging the same onto the top of said series of tubes.

Having described my invention, what I claim is—

1. In a regenerative pasteurizing system, the combination of a pasteurizing-coil comprising a series of horizontally-arranged superposed tubes, means for circulating a heating medium therethrough, a regenerative coil arranged vertically below the pasteurizing-coil and comprising a series of horizontally-superposed tubes, means for circulating the raw milk through the tubes of the regenerative coil, and means for flowing the milk from the regenerative coil downward over the external surfaces of the two coils in succession.

2. In a regenerative pasteurizing system, the combination of a pasteurizing-coil, a regenerative coil, and a cooling-coil, said coils being each composed of a series of horizontally-superposed tubes communicating with each other, the several coils being non-communicating and arranged one vertically above the other in a single vertical plane, the pasteurizing-coil at the top, the regenerative coil next, and the cooling-coil at the bottom, means for circulating a heating medium through the pasteurizing-coil, means for circulating the raw milk through the regenerative coil, means for circulating a cooling medium through the cooling-coil, and means for directing the milk from the regenerative coil onto the top of the pasteurizing-coil; whereby in flowing over the several coils, the milk will be successively pasteurized and cooled.

3. In a regenerative pasteurizing system, the combination with means for pasteurizing the raw milk, of means for circulating the pasteurized milk in proximity to but separated from the raw milk; whereby the temperature of the raw milk will be raised and that of the pasteurized milk correspondingly reduced, a primary cooling-coil comprising a series of horizontally-arranged superposed communicating tubes, a secondary non-communicating cooling-coil arranged vertically beneath the first and comprising a series of horizontal superposed tubes communicating with each other, means for circulating a cooling medium of a moderate temperature through the primary cooling-coil, means for independently circulating a cooling medium of a considerably lower temperature through the secondary cooling-coil, and means for discharging the pasteurized milk onto the primary coil; whereby in flowing over the external surface of the two cooling-coils in succession, the temperature of the milk will be gradually reduced.

4. In a regenerative pasteurizing system, the combination of a pasteurizing-coil comprising a series of horizontal superposed tubes communicating with each other, a non-communicating regenerative coil comprising a series of horizontal superposed tubes communicating with each other and arranged vertically beneath the pasteurizing-coil, means for circulating a heating medium through the pasteurizing-coil, means for circulating raw milk through the regenerative coil, means for directing the milk from the regenerative coil onto the top of the pasteurizing-coil, that it may flow down its external surface, and a receiving-trough interposed between the two coils in position to receive the milk from the pasteurizing-coil and direct it onto the regenerative coil.

5. In a regenerative pasteurizing system, the combination of an upper pasteurizing-coil comprising a series of horizontal superposed tubes communicating at their ends through manifolds, a regenerative coil arranged vertically beneath the pasteurizing-coil and comprising a series of open-ended horizontal superposed tubes communicating at their ends through manifolds, a cooler-coil arranged vertically beneath the regenerative coil and comprising a series of horizontal superposed tubes communicating at their ends through manifolds, fixed cap-plates closing the manifolds of the pasteurizing and cooling coils, removable cap-plates closing the manifolds of the regenerative coil, means for circulating a heating medium through the pasteurizing-coil, means for circulating a cooling medium through the cooling-coil, means for circulating the raw milk through the regenerative coil, and means for flowing the milk from the regenerative coil onto the top of the pasteurizing-coil.

In testimony whereof I hereunto set my hand, this 26th day of September, 1906, in the presence of two attesting witnesses.

CHARLES W. REID.

Witnesses:
W. R. KENNEDY,
R. M. PARKINS.